United States Patent
Iraneta et al.

(10) Patent No.: US 11,951,417 B2
(45) Date of Patent: Apr. 9, 2024

(54) SEC PERFORMANCE ENHANCING CONDITIONING AND STORAGE SOLVENTS CONTAINING LOW LEVELS OF BUFFER AND SALT

(71) Applicant: Waters Technologies Corporation, Milford, MA (US)

(72) Inventors: Pamela C. Iraneta, Brighton, MA (US); Stephen James Shiner, Holden, MA (US); Raymond P. Fisk, Norton, MA (US); Lavelay Kizekai, Coventry, RI (US)

(73) Assignee: Waters Technologies Corporation, Milford, MA (US)

(*) Notice: Subject to any disclaimer, the term of this patent is extended or adjusted under 35 U.S.C. 154(b) by 58 days.

(21) Appl. No.: 17/231,808

(22) Filed: Apr. 15, 2021

(65) Prior Publication Data
US 2021/0322896 A1 Oct. 21, 2021

Related U.S. Application Data

(60) Provisional application No. 63/010,487, filed on Apr. 15, 2020.

(51) Int. Cl.
*B01D 15/20* (2006.01)
*B01D 15/34* (2006.01)
(Continued)

(52) U.S. Cl.
CPC ............. *B01D 15/20* (2013.01); *B01D 15/34* (2013.01); *B01D 71/06* (2013.01); *G01N 30/50* (2013.01)

(58) Field of Classification Search
CPC ........ B01D 15/34; B01D 71/06; B01D 15/20; G01N 30/482; G01N 2030/484; G01N 30/50
See application file for complete search history.

(56) References Cited

U.S. PATENT DOCUMENTS 4,017,528 A 4/1977 Unger et al.
6,528,167 B2 3/2003 O'Gara
(Continued)

FOREIGN PATENT DOCUMENTS

WO WO-2017027796 A1 * 2/2017 ............. B01D 15/22

OTHER PUBLICATIONS

Stoll, D., "Column care for the long haul—considerations for column storage", LCGC North America, 35, 7, pp. 434-439. (Year: 2017).*

(Continued)

*Primary Examiner* — Benjamin L Lebron
(74) *Attorney, Agent, or Firm* — WOMBLE BOND DICKINSON (US) LLP; Deborah M. Vernon; Scott R. Breining

(57) ABSTRACT

This disclosure pertains to performance enhancing conditioning and storage solvents containing low levels of buffer and salt for reproducible and improved size exclusion chromatography (SEC). In some embodiments, the present disclosure pertains to storage solvents for protein-based size exclusion chromatography that include water, a water-miscible organic solvent, a phosphate salt, and a neutral salt. In some embodiments, the present disclosure pertains to columns for protein-based size exclusion chromatography that include porous particles and such a storage solvent.

9 Claims, 10 Drawing Sheets

(51) Int. Cl.
    *B01D 71/06* (2006.01)
    *G01N 30/50* (2006.01)

(56) References Cited

U.S. PATENT DOCUMENTS

| | | | |
|---|---|---|---|
| 6,686,035 | B2 | 2/2004 | Jiang et al. |
| 7,175,913 | B2 | 2/2007 | O'Gara |
| 7,919,177 | B2 | 4/2011 | Jiang et al. |

OTHER PUBLICATIONS

Goyon, A., et al., "Unraveling the mysteries of modern size exclusion chromatography—the way to achieve confident characterization of therapeutic proteins", Journal of Chromatography B, 1092, pp. 368-378. (Year: 2018).*
International Search Report and Written Opinion for International application No. PCT/US2021/027501, dated Jul. 14, 2021, 15 pages.
Iraneta, P.C., and Byrd, S., "Best Practices for Maintaining Column Performance in Size-Exclusion Chromatography during Long-Term Storage", Waters Corporation Application Note (2021) 17 pages.
Koza, Stephan "Developing SEC Methods for Proteins and Modified Proteins" [online] Biopharma LC Meeting Oct. 16-17, 2012 [retrieved on Jul. 1, 2021]. Retrieved from Internet URL: URL:https://www.waters.com/webassets/cms/events/docs/LC%20Biopharma Steve%20Koza%20Oct%2017%20EU%20Biopharma%20SEC%20Seminar.pdf.
Miyagi, H., et al., "Analysis of body functions using a clinical liquid chromatograph", Journal of Chromatography A 239:733-745 (1982).
Ratto, J.J., et al., "Ethanol—sodium chloride—phosphate mobile phase for size-exclusion chromatography of poly (ethylene glyco) modified proteins", Journal of Chromatography A 763(1-2)L337-344 (1997).
Waters, "Acquity UPLC™ BEH Column Care and Use Instructions", [online] 2006 [retrieved on Jul. 1, 2021]. Retrieved from Internet URL: URL:https://www.waters.com/webassets/cms/support/docs/WA40001.pdf.
Waters, "Guide to Size-Exclusion Chromatography (SEC) of mAb Aggregates Monomers, and Fragments", [online] Mar. 2020 [retrieved on Jul. 1, 2021]. Retrieved from Internet URL: URL: https://www.waters.com/webassets/cms/library/docs/720006067en.pdflocale=enUS.
Waters: "Acquity UPLC Protein BEH SEC Columns and Standards" [online] [retrieved on Jul. 1, 2021]. Retrieved from Internet URL:https://www.waters.com/waters/download.htm?lid=134655445&id=134655444&fileName=Download%20PDF&fileUrl=/webassets/cms/support/docs/720003385en.pdf.

* cited by examiner

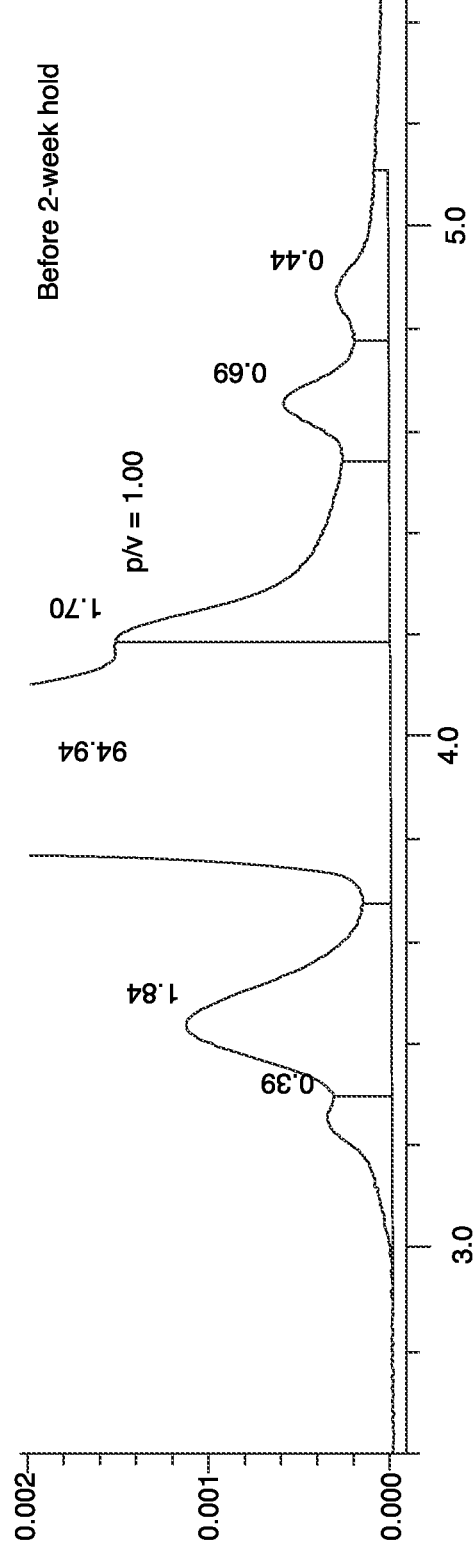
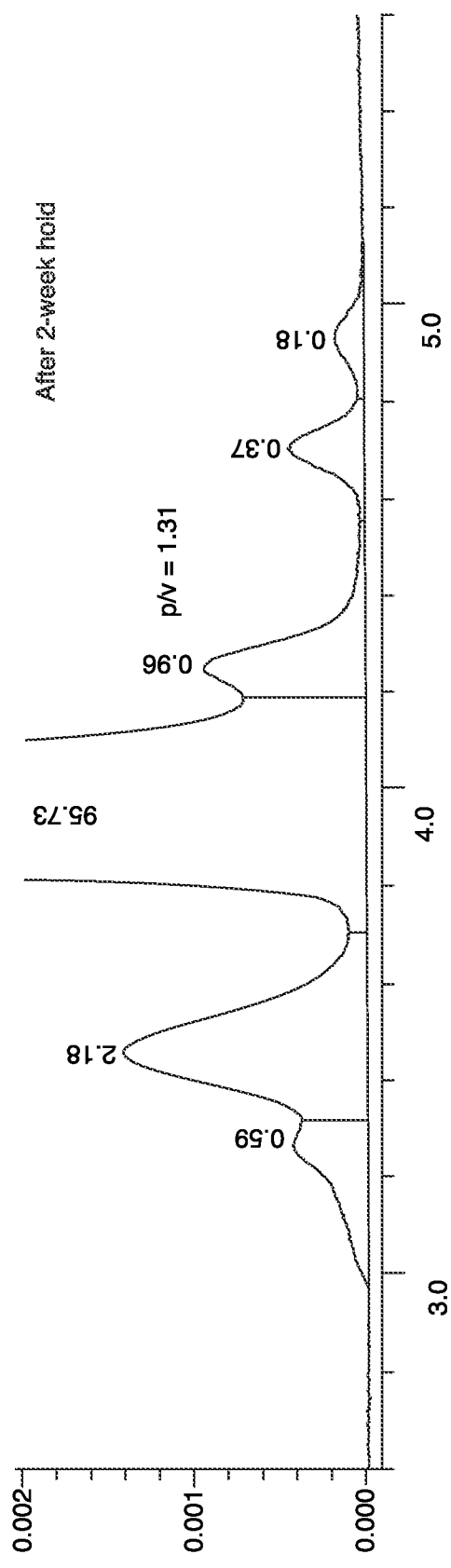
FIG. 3A
FIG. 3B

SEC PERFORMANCE ENHANCING CONDITIONING AND STORAGE SOLVENTS CONTAINING LOW LEVELS OF BUFFER AND SALT

CROSS REFERENCE TO RELATED APPLICATION

This application claims the benefit of U.S. Provisional Application No. 63/010,487, filed Apr. 15, 2020 and entitled "SEC PERFORMANCE ENHANCING CONDITIONING AND STORAGE SOLVENTS CONTAINING LOW LEVELS OF BUFFER AND SALT", the entire disclosure of which is hereby incorporated by reference.

FIELD

The present disclosure pertains to conditioning and storage solvents for improved size exclusion chromatography (SEC) performance.

BACKGROUND

Size-exclusion chromatography (SEC) is a chromatographic method in which molecules in solution are separated by their size. A primary application of SEC chromatography is the fractionation of proteins, including monoclonal antibodies (mAB). Various SEC columns are commercially available from Waters Corporation (Milford MA, USA) and other vendors.

A typical SEC chromatogram for size variant separations of monoclonal antibodies (mAbs) is shown in FIG. 1 along with associated nomenclature. The chromatographic parameter that this disclosure focuses on is the resolution between the main monomer peak and its closest eluting size variant (~100 kDa) referred to as its clip, Fab/c, or LMW1. For peaks that are reasonably resolved, the USP resolution at half height (R(USP,HH)) is used to describe the quality of the resolution (see FIG. 2A). For more difficult to resolve peaks, the peak-height to valley-height ratio (p/v) is used to describe the quality of the resolution (see FIG. 2B). In this calculation the peak height refers to the smallest of 2 poorly resolved peaks and the valley height is that which lies between the 2 poorly resolved peaks. The parameter is preceded by "start" when the smallest peak is the $2^{nd}$ peak of the 2 poorly resolved peaks. It is the start p/v parameter that is used to describe the resolution problems addressed by this disclosure.

SEC columns can suffer from multiple weaknesses. One is poor recovery of mAb aggregates, which is generally treated by injecting high concentrations of a protein to block the problematic secondary interactions prior to the analysis of mAb samples. A second is due to "hockey stick" tailing of the main monomer peak, which interferes with achieving reproducible and sufficient resolution (start p/v ratios) between the monomer and the 100 kDa clip. Start p/v ratios of >1.3 allow semi-quantification of the clip. Values of >2.5 p/v are desired for quantitative results. Attempts to mitigate monomer tailing by injecting high concentrations of proteins has failed to resolve this deficiency in performance.

SUMMARY

This disclosure pertains to performance enhancing conditioning and storage solvents containing low levels of buffer and salt for reproducible and improved size exclusion chromatography (SEC).

In some embodiments, the present disclosure pertains to storage solvents for protein-based size exclusion chromatography that comprise water, a water-miscible organic solvent, a phosphate salt, and a neutral salt.

In some of these embodiments, the water-miscible solvent is selected from methanol, ethanol, isopropyl alcohol and acetonitrile.

In some embodiments, which can be used in conjunction with the above embodiments, the storage solvent comprises from 1 to 20 vol % of the water-miscible solvent.

In some embodiments, which can be used in conjunction with the above embodiments, the storage solvent comprises from 5 to 15 vol % of the water-miscible solvent and the water-miscible solvent is acetonitrile.

In some embodiments, which can be used in conjunction with the above embodiments, the phosphate salt is selected from alkali metal phosphate salts and ammonium phosphate.

In some embodiments, which can be used in conjunction with the above embodiments, the storage solvent comprises from 5 to 100 mM phosphate salt.

In some embodiments, which can be used in conjunction with the above embodiments, the storage solvent comprises from 10 to 50 mM sodium phosphate salt.

In some embodiments, which can be used in conjunction with the above embodiments, the neutral salt is selected from alkali metal halide salts, ammonium halide salts, alkali metal sulfate salts, ammonium sulfate salts, alkali metal nitrate salts, and ammonium nitrate salts.

In some embodiments, which can be used in conjunction with the above embodiments, the storage solvent comprises from 20 to 500 mM neutral salt.

In some embodiments, which can be used in conjunction with the above embodiments, the storage solvent comprises from 50 to 200 mM potassium chloride salt.

In some embodiments, the present disclosure pertains to columns for protein-based size exclusion chromatography that comprise (a) porous particles and (b) a storage solvent in accordance with any of the above embodiments.

In some of these embodiments, the porous particles have a diameter ranging from 1 to 10 μm.

In some embodiments, which can be used in conjunction with the above embodiments, the porous particles have an average pore diameter ranging from 50 to 1000 Angstroms.

In some embodiments, which can be used in conjunction with the above embodiments, the porous particles comprise bulk material having covalently attached hydrophilic surface moieties.

In some of these embodiment, the bulk material is a silicon-based inorganic-organic hybrid material.

In some embodiments, which can be used in conjunction with the above embodiments, the covalently attached hydrophilic surface moieties comprise dihydroxylated aliphatic groups in which two hydroxyl groups are positioned on adjacent carbon atoms in an aliphatic chain.

In some embodiments, which can be used in conjunction with the above embodiments, the covalently attached hydrophilic surface moieties comprise hydroxy-terminated poly(alkylene oxide) groups.

In some embodiments, which can be used in conjunction with the above embodiments, the column comprises a housing having an inlet and an outlet and the porous particles and the storage solvent are provided in the housing.

In some of these embodiments, the housing comprises a metallic tube.

In some embodiments, which can be used in conjunction with the above embodiments, a plug or a valve is provided at the entrance and the exit to hold the storage solvent within the housing.

BRIEF DESCRIPTION OF THE DRAWINGS

FIGS. 3A-3B show mAb variant chromatograms generated using columns immediately after rinsing (FIG. 3A) and after a 2-week hold (FIG. 3B).

DETAILED DESCRIPTION

Figure 1:
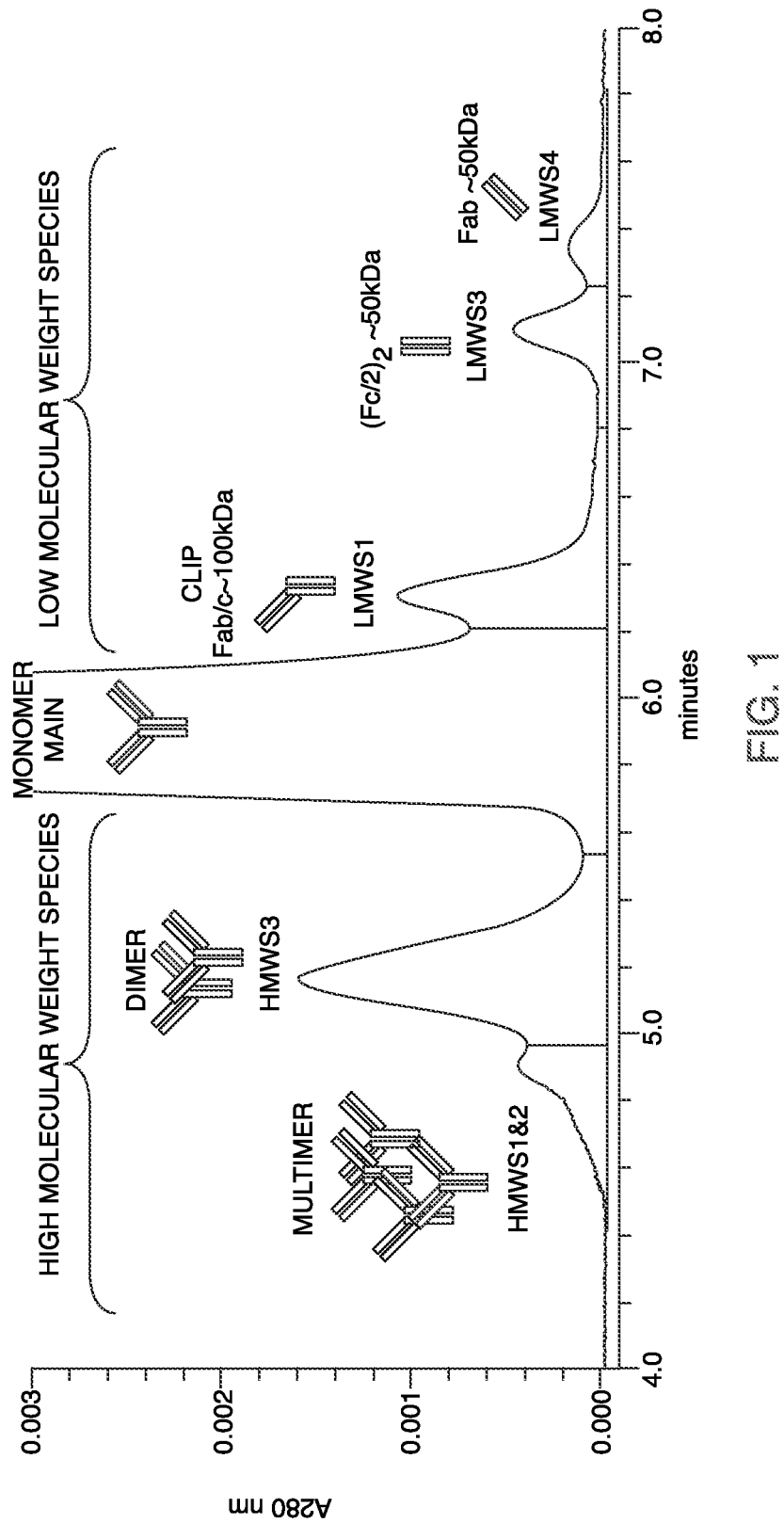
FIG. 1 shows a typical SEC chromatogram for size variant separations of monoclonal antibodies (mAbs).
Figure 2A:
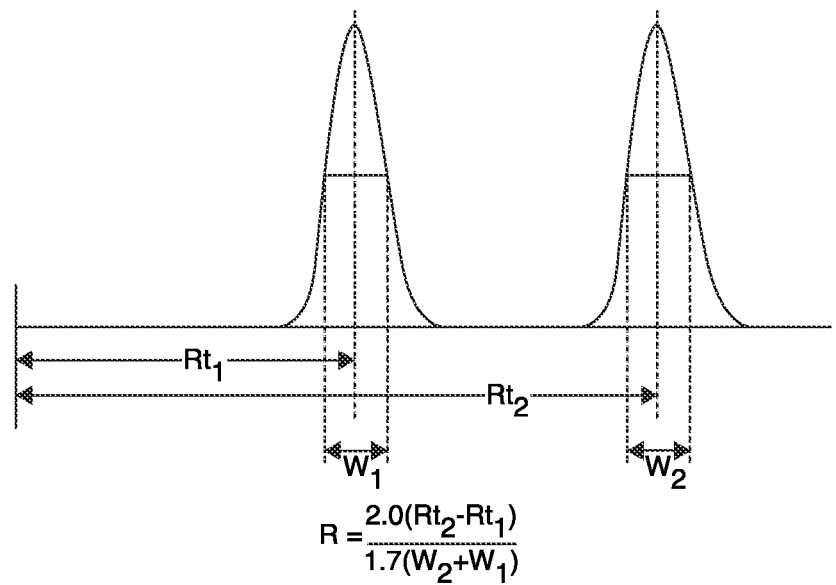
FIG. 2A illustrates a method for the calculation of the resolution at half height between two well-resolved adjacent peaks.
Figure 2B:
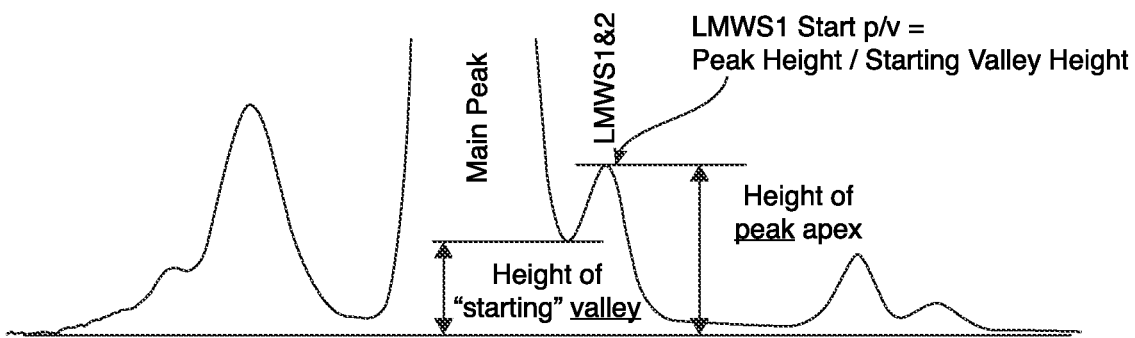
FIG. 2B illustrates a method for the calculation of the peak-height to valley-height ratio (p/v), which is used to describe the quality of the resolution for more difficult to resolve peaks.
Figure 4A:
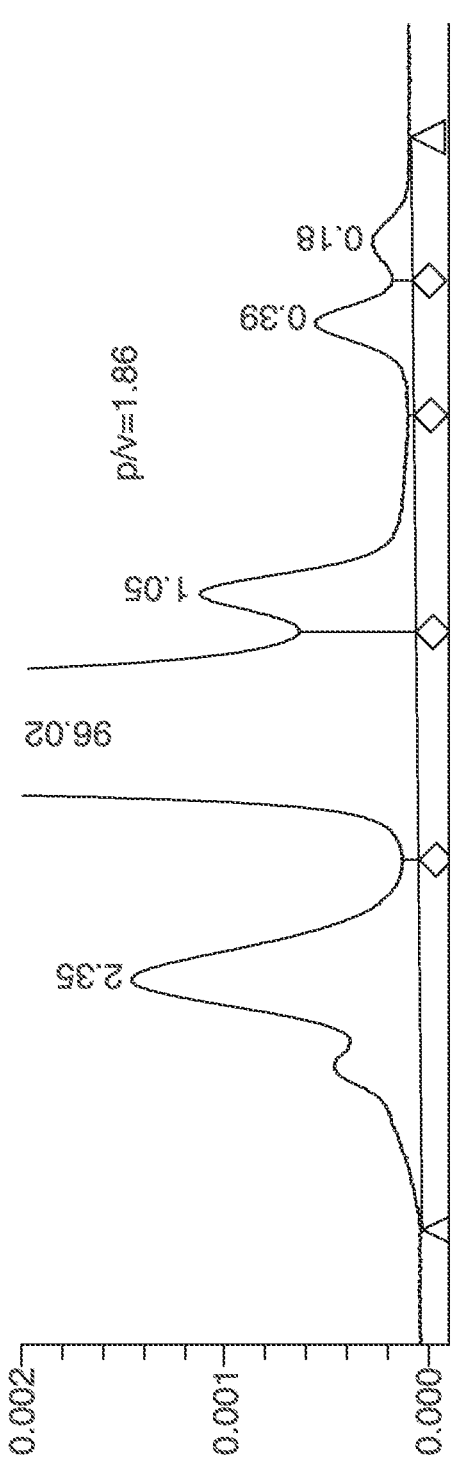
FIGS. 4A-4B and 5A-5C are mAb variant chromatograms for multiple stock purchased columns.
Figure 4B:
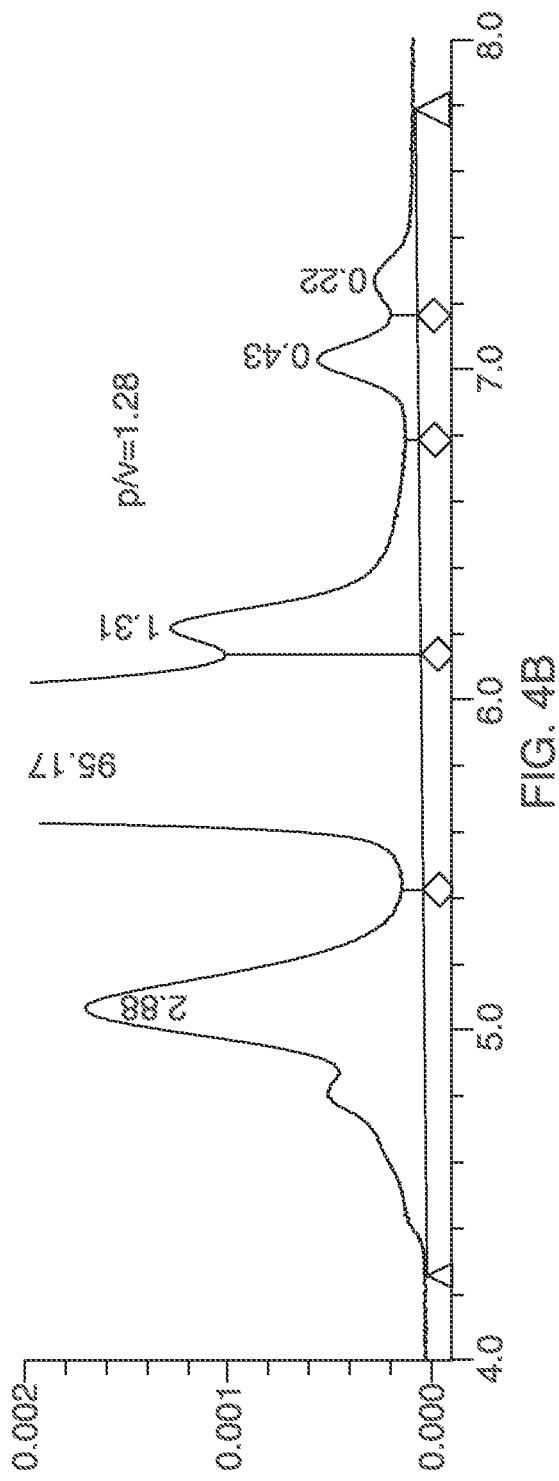

This disclosure pertains to performance enhancing conditioning and storage solvents containing low levels of buffer and salt. In some embodiments, this disclosure pertains to performance enhancing conditioning and storage solvents for reproducible and improved SEC of mAb monomer, high molecular weight species recovery, and low molecular weight (LMW1) 100 kDa clip resolution, as detailed below.

In various embodiments, the present disclosure provides solvents for long term (i.e., at least four months) column storage that contain a water, a water-miscible organic solvent, a phosphate salt and a neutral salt.

Examples of water-miscible solvents include methanol, ethanol, isopropyl alcohol and acetonitrile, among others. Amounts of water-miscible solvents may range, for example, from 1 to 20 vol %, more particularly, 5 to 15 vol %, even more particularly, 8 to 12 vol %, among other values.

Examples of phosphate salts include alkali metal (e.g., sodium, potassium, etc.) phosphate salts and ammonium phosphate salts (e.g., sodium phosphate salts, potassium phosphate salts, ammonium phosphate salts, etc.). Amounts of phosphate salts may range from 5 mM or less to 200 mM or more, for example, ranging from 5 mM to 10 mM to 20 mM to 50 mM to 100 mM to 200 mM (i.e., the amount of phosphate salts may range between any two of the preceding values). In certain embodiments the phosphate salt ranges from 10 to 50 mM.

Examples of neutral salts include alkali metal and ammonium halogen (e.g., chloride, bromide, etc.) salts (e.g., sodium chloride, potassium chloride, ammonium chloride, sodium bromide, potassium bromide, ammonium bromide, etc.), alkali metal and ammonium sulfate salts (e.g., sodium sulfate, potassium sulfate, ammonium sulfate, etc.), alkali metal and ammonium nitrate salts (e.g., sodium nitrate, potassium nitrate, ammonium nitrate, etc.), alkali metal and ammonium organic acid (e.g., formate, acetate, etc.) salts (e.g., sodium formate, potassium formate, ammonium formate, sodium acetate, potassium acetate, ammonium acetate, etc.). Amounts of neutral salts may range, for example, from 10 mM or less to 500 mM or more, for example, ranging from 10 mM to 25 mM to 50 mM to 100 mM to 200 mM to 500 mM.

In order to preserve conditioning and antimicrobial state of the columns, shorter term storage solvents between uses may be employed. Such solvents may contain (a) water-miscible solvents including those described above at the concentrations described above and (b) the phosphate salts and neutral salts described above in amounts that are 0.1 to 0.5 times the concentrations described above. In other embodiments, such solvents may contain (a) water-miscible solvents including those described above the concentrations described above and (b) 0.1 to 0.5 times an amount of whatever buffer salts are used in the mobile phase during analysis.

In some aspects, the present disclosure pertains to columns for protein-based size exclusion chromatography that contain a stationary phase and a storage solvent that comprises water, a water-miscible organic solvent, a phosphate salt and a neutral salt like that described above.

Columns for use herein typically comprise a housing having at least one wall defining a chamber and having an entrance and an exit. Within the housing is provided the stationary phase material and the storage solvent. In certain embodiments, a plug or a valve is provided at the entrance and the exit to hold the storage solvent within the chamber. In certain embodiments, the entrance, the exit, or both, are provided with a fitting element adapted for fitting the column to another element within a fluid path. In certain embodiments, the housing is in the form of a metallic tube.

In some embodiments, the stationary phase material is a porous stationary phase material. In certain embodiments, porous stationary phase material has an average pore diameter ranging from 50 Angstroms or less to 3000 Angstroms or more. For example, the average pore diameter may range anywhere from 50 Angstroms to 100 Angstroms to 250 Angstroms to 500 Angstroms to 1000 Angstroms to 3000 Angstroms. Average pore diameter (APD) is measured by conventional porosimetry methods. For sub-500 Angstrom pores, the average pore diameter (APD) can be measured using the multipoint N2 sorption method (Micromeritics ASAP 2400; Micromeritics Instruments Inc., Norcross, GA), with APD being calculated from the desorption leg of the isotherm using the BJH method as is known in the art. Hg porosimetry may be used for pores that are 400 Angstrom or greater, as is known in the art.

In some embodiments, the stationary phase material is in the form of particles, typically spherical particles, having a diameter ranging from 0.25 to 100 μm, for example, ranging from 0.25 μm to 0.5 μm to 1 μm to 2.5 μm to 5 μm to 10 μm to 25 μm to 50 μm to 100 μm.

In some of these embodiments, the column may be provided with one or more frits (e.g., with at least one frit provided at the inlet and at least one frit provided at the outlet) to hold the particulate stationary phase material within the chamber.

Stationary phase materials for use herein include those that comprise a bulk material (e.g., a particulate bulk material) with covalently attached hydrophilic surface moieties.

Bulk materials may be selected from inorganic bulk materials (e.g., silica alumina, titanium, cerium, or zirconium or oxides thereof, or ceramic material), organic bulk materials (e.g., organic polymers) and inorganic-organic hybrid materials. "Organic-inorganic hybrid material" includes inorganic-based structures wherein an organic functionality is integral to both the internal or "skeletal" inorganic structure as well as the hybrid material surface. The inorganic portion of the hybrid material may be, e.g., silica, alumina, titanium, cerium, or zirconium or oxides thereof, or ceramic material. Exemplary hybrid materials are shown in U.S. Pat. Nos. 4,017,528, 6,528,167, 6,686,035, 7,175,913 and 7,919,177, the disclosures of which are hereby incorporated in their entirety.

In some embodiments, the bulk material may comprise a silicon-based inorganic-organic hybrid material that includes inorganic regions in which the material comprises silicon atoms having four silicon-oxygen bonds and hybrid regions in which the material comprises silicon atoms having one or more silicon-oxygen bonds and one or more silicon-carbon bonds. In some cases the hybrid regions may comprise a substituted or unsubstituted alkylene, alkenylene, alkynylene or arylene moiety bridging two or more silicon atoms. For example the hybrid regions may comprise a substituted or unsubstituted $C_1$-$C_{18}$ alkylene, $C_2$-$C_{18}$ alkenylene, $C_2$-$C_{18}$alkynylene or $C_6$-$C_{18}$ arylene moiety bridging two or more silicon atoms. In particular embodiments, the hybrid regions may comprise a substituted or unsubstituted $C_1$-$C_6$ alkylene moiety bridging two or more silicon atoms, including methylene, dimethylene, or trimethylene moieties bridging two silicon atoms. In particular embodiments, the hybrid regions comprises may comprise ≡Si—$(CH_2)_n$—Si≡ moieties, where n is an integer, and may be equal to 1, 2, 3, 4, 5, 6 or more.

In some embodiments, silicon-based inorganic-organic hybrid materials may be formed by hydrolytically condensing one or more alkoxysilane compounds. Examples of alkoxysilane compounds include, for instance, tetraalkoxysilanes (e.g., tetramethoxysilane (TMOS), tetraethoxysilane (TEOS), etc.), alkylalkoxysilanes such as alkyltrialkoxysilanes (e.g., methyl trimethoxysilane, methyl triethoxysilane (MTOS), ethyl triethoxysilane, etc.) and bis(trialkoxysilyl)alkanes (e.g., bis(trimethoxysilyl)methane, bis(trimethoxysilyl)ethane, bis(triethoxysilyl)methane, bis(triethoxysilyl)ethane (BTE), etc.), as well as combinations of the foregoing. In certain of these embodiments, silicon-based inorganic-organic hybrid materials may be prepared from two alkoxysilane compounds, for example, a tetraalkoxysilane such as TMOS or TEOS and an alkylalkoxysilane such as MTOS or a bis(trialkoxysilyl)alkane such as BTEE. When BTEE is employed, the resulting materials are organic-inorganic hybrid materials, which are referred to as ethylene bridged hybrid (BEH) materials and can offer various advantages over conventional silica, including chemical and mechanical stability. One particular BEH material can be formed from hydrolytic condensation of TEOS and B TEE.

As noted above, stationary phase materials for use herein include those that comprise a bulk material with covalently attached hydrophilic surface moieties and, in some embodiments, particles that comprise a particulate bulk material with covalently attached hydrophilic surface moieties. Various bulk materials are described above.

In some embodiments, the covalently attached hydrophilic surface moieties may comprise polyhydroxylated aliphatic groups, for example, dihydroxylated aliphatic groups in which two hydroxyl groups are positioned on adjacent carbon atoms in an aliphatic chain (e.g., dihydroxypropyl groups), also referred to as diol groups. In particular embodiments where the surface of the bulk material comprises silanol groups (e.g. silica and silicon-based inorganic-organic hybrid bulk materials) the covalently attached hydrophilic surface moieties may comprise (dihydroxyalkoxy)alkyl silane groups, for example, (dihydroxy-$C_1C_4$-alkoxy) $C_1C_4$-alkyl silane groups, such as [3-(2,3-dihydroxypropoxy)propyl]-silane groups.

Various columns for protein-based SEC are available from Waters Corporation (Milford MA, USA), which contain a porous silicon-based inorganic-organic hybrid material (bridged ethylene hybrid (BEH) particles) surface modified with covalently attached diol groups. Compared to silica-based, diol coated particles, BEH particles modified with surface modified diol groups, provide a significant reduction in silanol activity, thus reducing undesired ionic interactions between SEC particles and proteins. In addition, the high mechanical strength of the BEH particles enables reduction in particle size to 1.7 μm or less, providing gains in chromatographic efficiency and the ability to effectively reduce SEC analysis times. In addition to the 1.7 μm size, the BEH-based, SEC particles are available in 2.5 μm and 3.5 μm sizes. The BEH-based, SEC particles are available in pore sizes of 125 Å (BEH125), 200 Å (BEH200) and 450 Å (BEH450).

In other embodiments, the covalently attached hydrophilic surface moieties may comprise PEG-based surface moieties. In some embodiments, bulk materials such as those described above comprise covalently attached hydrophilic surface moieties that comprise hydroxy-terminated poly(alkylene oxide) groups, particularly hydroxy-terminated polyethylene glycol (PEG) groups. In particular embodiments where the surface of the bulk material comprises silanol groups (e.g. silica and silicon-based inorganic-organic hybrid bulk materials such as BEH particles) the covalently attached hydrophilic surface moieties may comprise the formula,

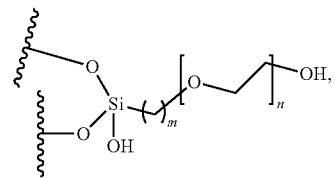

where m is an integer from about 1 to about 10, n is an integer from about 2 to about 50, and the wavy lines indicate points of attachment to the surface of the bulk material. These and other materials are described in co-pending U.S. Patent Application No. 63/079,301 entitled "A Sorbent used to Improve Chromatographic Separations in Size Exclusion Chromatography via Reduced Secondary Interactions," the disclosure of which is hereby incorporated by reference.

Examples

Figure 5A:
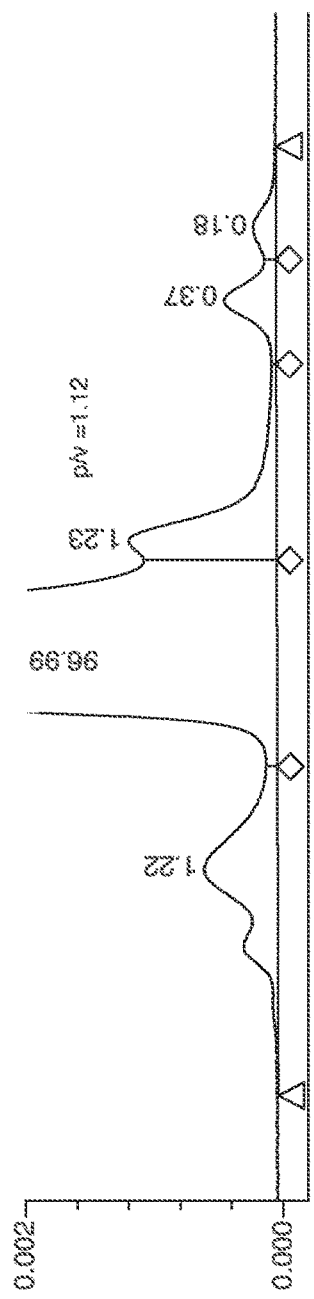
Figure 5B:
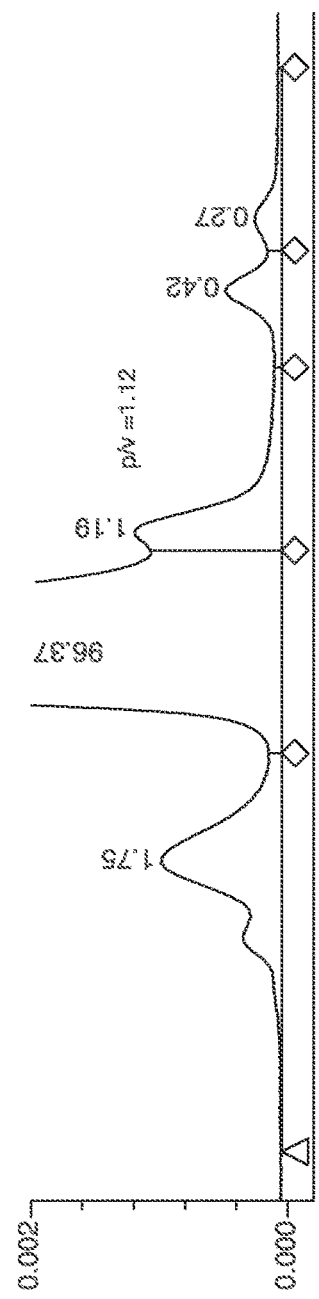
Figure 5C:
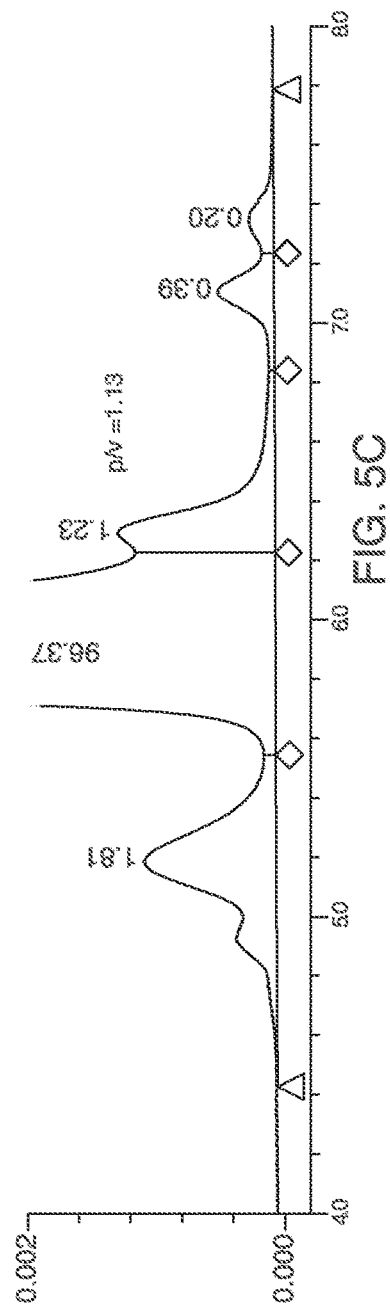

In the following Examples, SEC BEH columns are packed with various storage solvents for various hold periods. mAb size variant testing using the columns was performed under the following experimental conditions (or under analogous experimental conditions):
System
Waters Acquity UPLC H-Class with FTN Sample manager, 1 mm Needle placement from bottom; TUV with Titanium Flow Cell; QSM; and CH-30A Column Heater (Preheater not Active)
Column: Waters XBridge BEH200 SEC 2.5 μm Stainless Steel
mAb Test Conditions
Mobile Phase: 50 mM sodium phosphate buffer+200 mM KCl (e.g., FIGS. 4A-4B, 5A-5C, FIG. 9)
   10 mM Sodium Phosphate 0.5M NaCl, pH 7.0 (e.g., FIGS. 3A-3B)
Flow Rate: 1440 μL/minute (e.g., FIG. 9)
   300 μL/minute (e.g., FIGS. 3A-3B)
   200 μL/minute (e.g., FIGS. 4A-4B, 5A-5C)
Column i.d. x L: 7.8 mm×300 mm
Column Temperature: 35° C.
UV Wavelength: 280 nm
Injection Volume: 10 μL (e.g., FIG. 9)
   2 μL (e.g., FIGS. 3A-3B, FIGS. 4A-4B)
   1.8 μL (e.g., FIGS. 5A-5C)
Needle Wash: Milli-Q water
Purge: Milli-Q water
Seal Wash: 10% methanol/90% Milli-Q Water
Sample Conc. (Waters mAb Size Variant Standard (SKU: 186009429))
mAb Size Variant Standard 2.28 μg/μL (e.g., FIG. 5A-5C, FIG. 9)
   2.5 μg/μL (e.g., FIGS. 3A-3B, 4A-4B)
Uracil Test Sequence
   1. 80/20 Water/MeOH @ 1.15 mL/min (16 min)
   2. Efficiency Test 3 injections (Uracil 0.1 mg/mL).

SEC BEH columns packed using organic solvents benefit from a two-week hold period after rinsing/purging each column with the following sequence of mobile phases: water (2.4 empty column volumes)→10 mM Sodium Phosphate, 0.5M NaCl (8 empty column volumes)→water (1.2-1.3 empty column volumes)→and 20/80 methanol/water (20 vol % MeOH) (2.6 empty column volumes). Methanol is used in the storage solvent to mitigate microbial growth in place of the now-prohibited use of sodium azide, which had been the historically ubiquitous anti-microbial used for this application area.

FIGS. 3A-3B show mAb variant chromatograms generated using the columns. The FIG. 3A chromatogram was generated soon after this rinsing sequence was completed. The FIG. 3B chromatogram was generated after a 2-week hold. The chromatogram of FIG. 3B shows observed improvements from this rinsing sequence and 2-week hold, in especially the clip resolution.

Unfortunately, the above protocol can be inconsistent in producing the desired and reproducible performance. FIGS. 4A-4B and 5A-5C are mAb variant chromatograms for multiple stock purchased columns. As can be seen by comparing FIG. 4A and FIG. 4B, and by comparing FIG. 5A, FIG. 5B and FIG. 5C, there is significant column to column variation of between equivalently treated stock purchased columns.

Figure 6A:
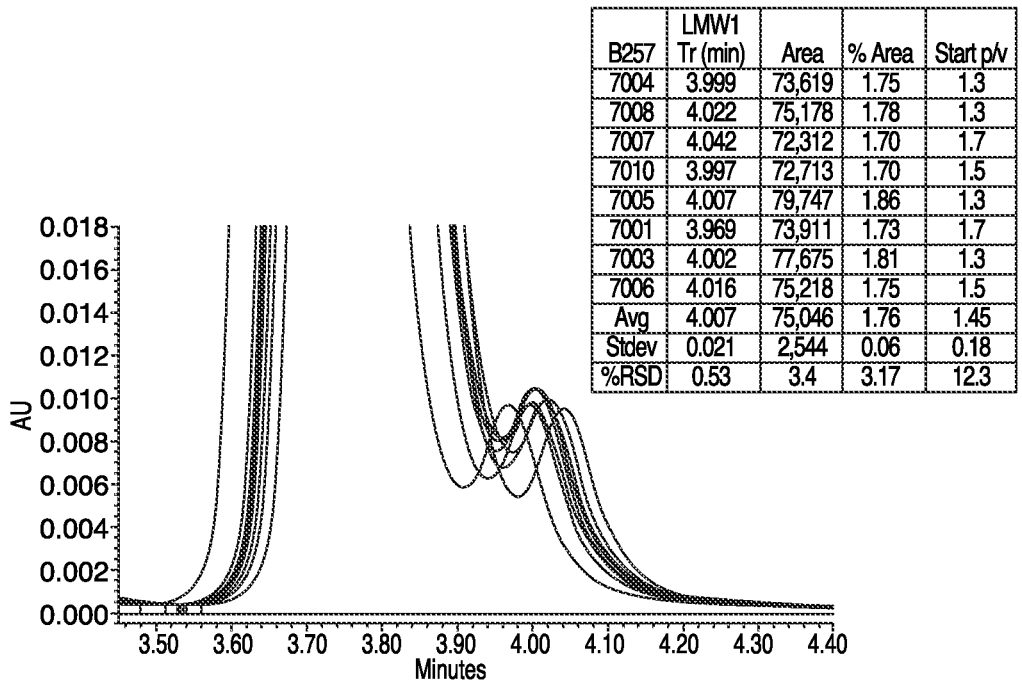
FIG. 6A shows mAb variant chromatograms a first column batch.
Figure 6B:
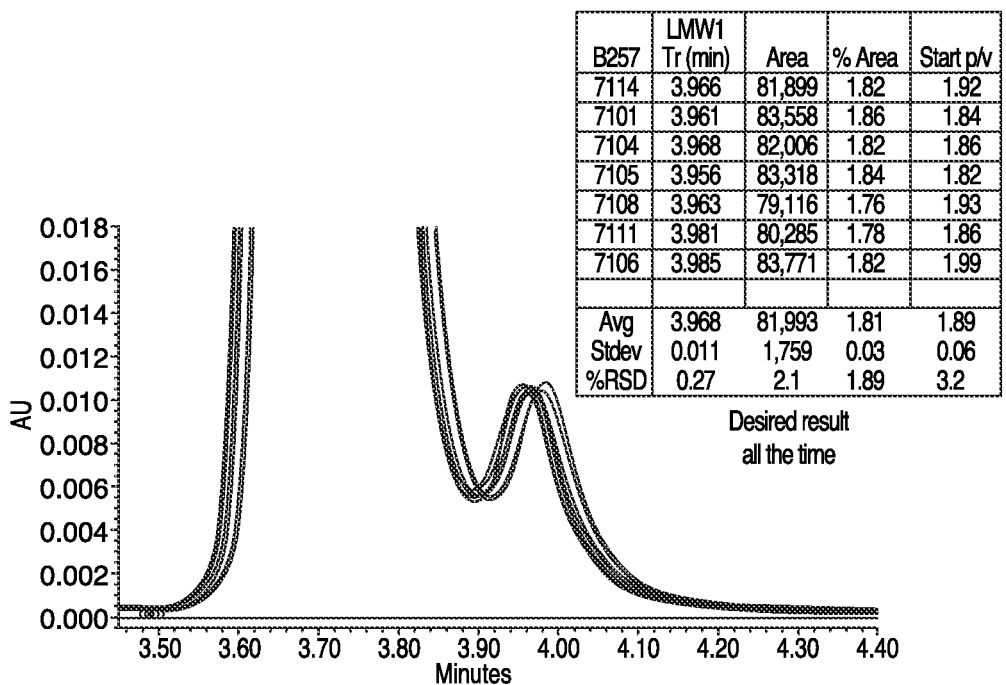
FIG. 6B shows mAb variant chromatograms for a latter-packed second column batch.

It is noted that the above protocol allows for about 8 empty column volumes (CVs) of a high salt low phosphate buffer to be passed through the column followed by about 1.25 CVs of water then 2.6 CVs of 20% methanol in water. If all columns are purged according to the above protocol, then the head of the column is left having a lower salt concentration than the outlet end of the column. The amount of residual buffer and salt in a given column has been estimated to about 0.3 mM phosphate and 16 mM NaCl remaining in the 20% MeOH storage solvent left in the column. Initially, reproducibility issues were thought to be solely related to batch differences, but studies showed that this was not the case. To test for this issue, columns from the same batch were packed about 5 months apart into sets of 7 or 8 columns using the same pack stations, processes, test systems and protocols. FIG. 6A shows mAb variant chromatograms the first batch, while FIG. 6B shows mAb variant chromatograms for the latter-packed second batch. While the second batch showed good consistency, the differences in clip resolution between columns of the first batch were apparent. Although nominally all columns receive the same amount of 20% methanol, variations due to the shower head parallel purging performed in column manufacturing potentially lead to column to column differences in what has been identified as consequential—the amount of residual salt remaining in the column during storage. Ultimately, the result of the preceding protocol is that column to column irreproducibility can be undesirably high.

Figure 7A:
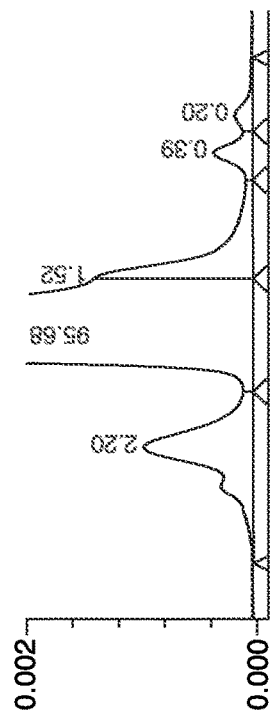
FIGS. 7A-7C show mAb variant chromatograms for three columns before storing in 20% MeOH for 2-weeks.
Figure 7B:
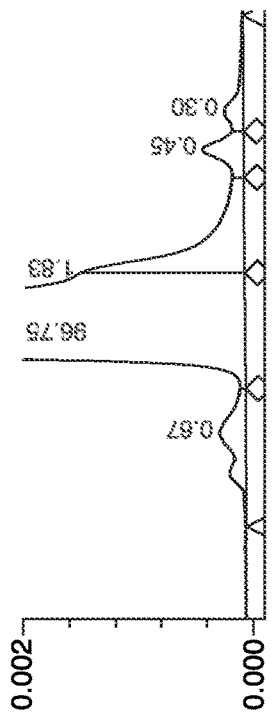
Figure 7C:
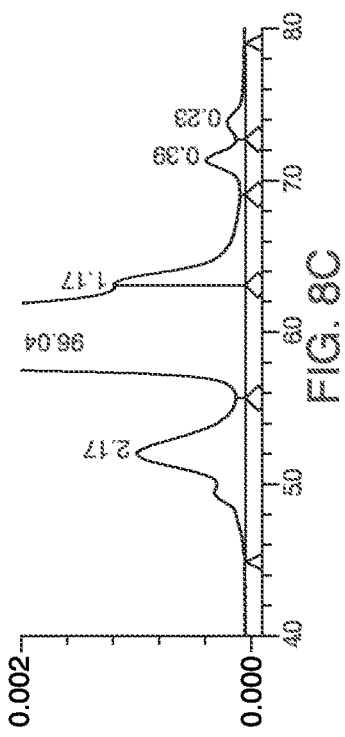
Figure 8A:
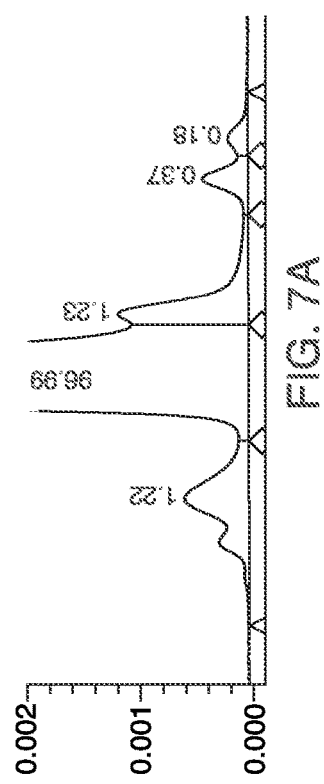
FIGS. 8A-8C show mAb variant chromatograms for the same three columns after storing in 20% MeOH for 2-weeks.
Figure 8B:
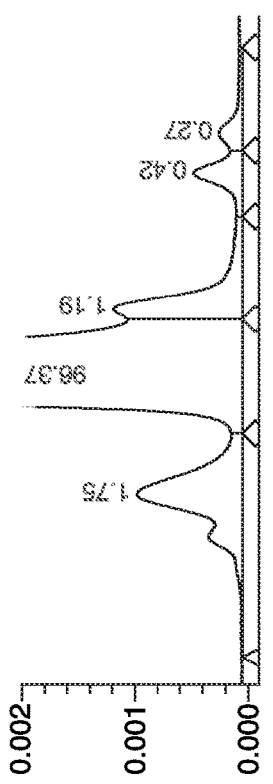
Figure 8C:
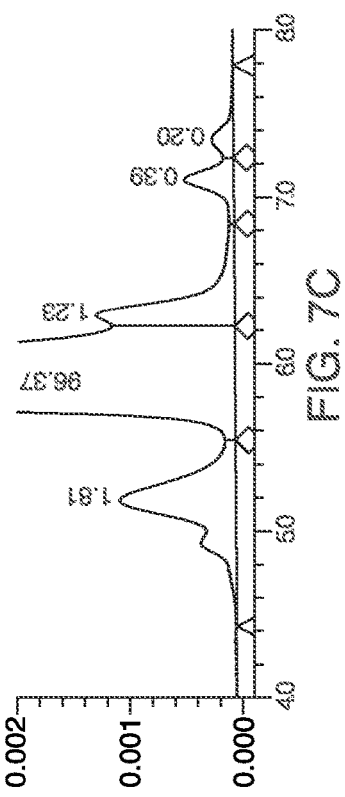
Figure 9:
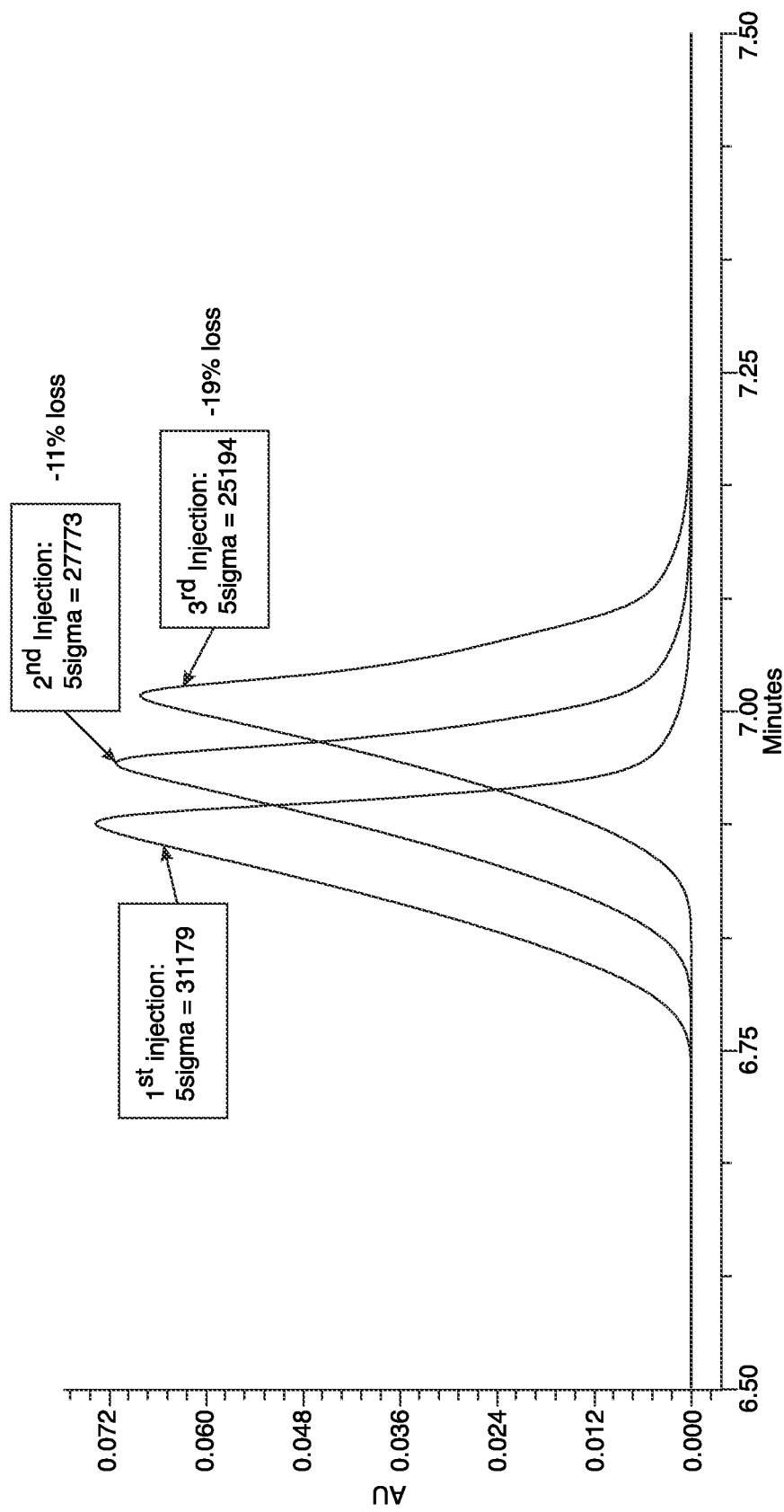
FIG. 9 shows efficiency testing (3 injections (Uracil 0.1 mg/mL)) of a column after 30 days of storage at 5° C.

It has been discovered that the use of a low concentrations of buffer and salt in the storage solvent leads to development and maintenance of reproducible and improved performance. In addition, issues have been encountered with the use of methanol as the co-solvent in the storage solvent. For example, FIGS. 7A-7C show mAb variant chromatograms for three columns before storing in 20% MeOH for 2-weeks. FIGS. 8A-8C show mAb variant chromatograms for the same three columns after storing in 20% MeOH for 2-weeks. As can be seen by comparing these figures, clip resolution is much worse after storage in 20% MeOH for 2-weeks. Problems with the use of methanol for testing uracil efficiency have been well documented in the past. An example of what has been deemed a long-equilibration-time problem is shown in FIG. 9, which shows efficiency testing (3 injections (Uracil 0.1 mg/mL)) of a column after 30 days of storage at 5° C. When 20% MeOH is used, uracil retention time and efficiency continues to change when tested. A similar shifting of retention was also observed with 10% acetonitrile (ACN) in water.

Figure 10A:
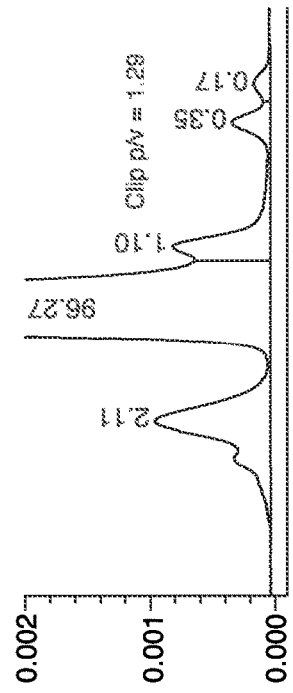
FIGS. 10A-10C show mAb variant chromatograms for three columns before storing in 25 mM sodium phosphate and 100 mM potassium chloride in 10% acetonitrile.
Figure 10B:
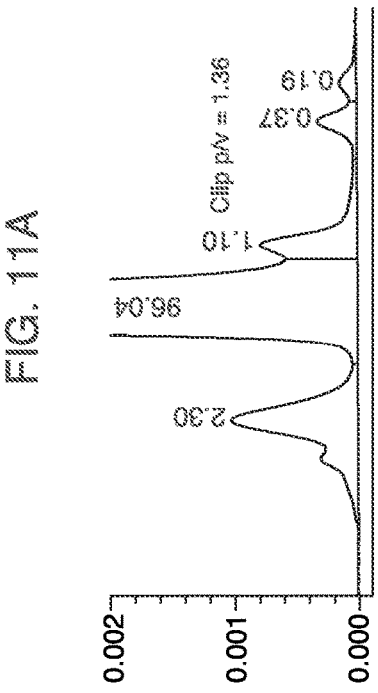
Figure 10C:
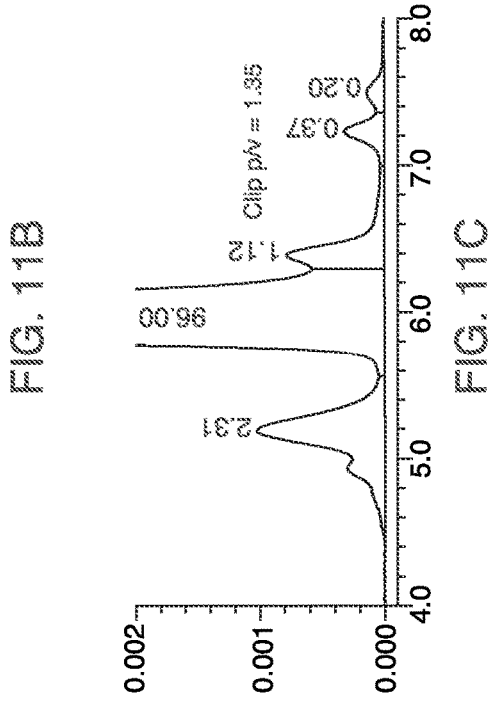
Figure 11A:
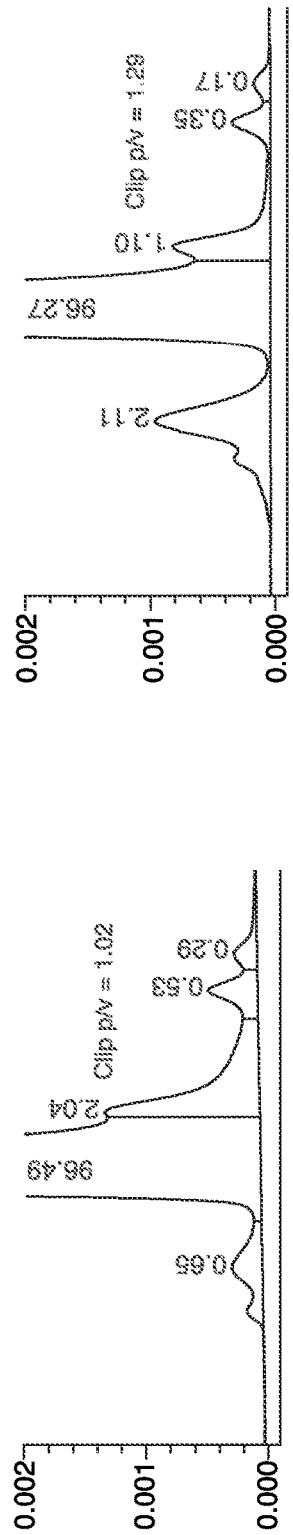
FIGS. 11A-11C show mAb variant chromatograms for the same three columns after storing in 25 mM sodium phosphate and 100 mM potassium chloride in 10% acetonitrile for 2-weeks.
Figure 11B:
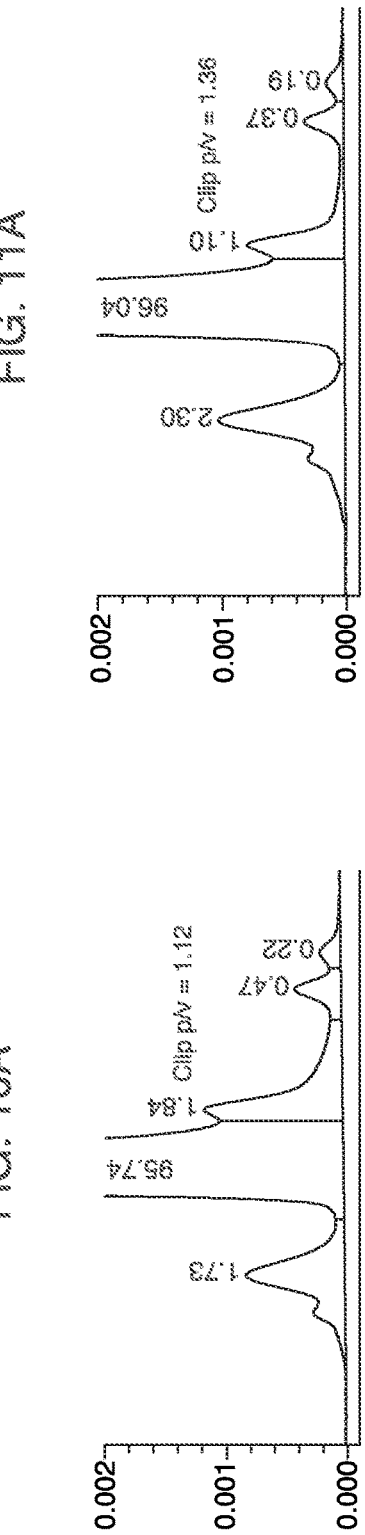
Figure 11C:
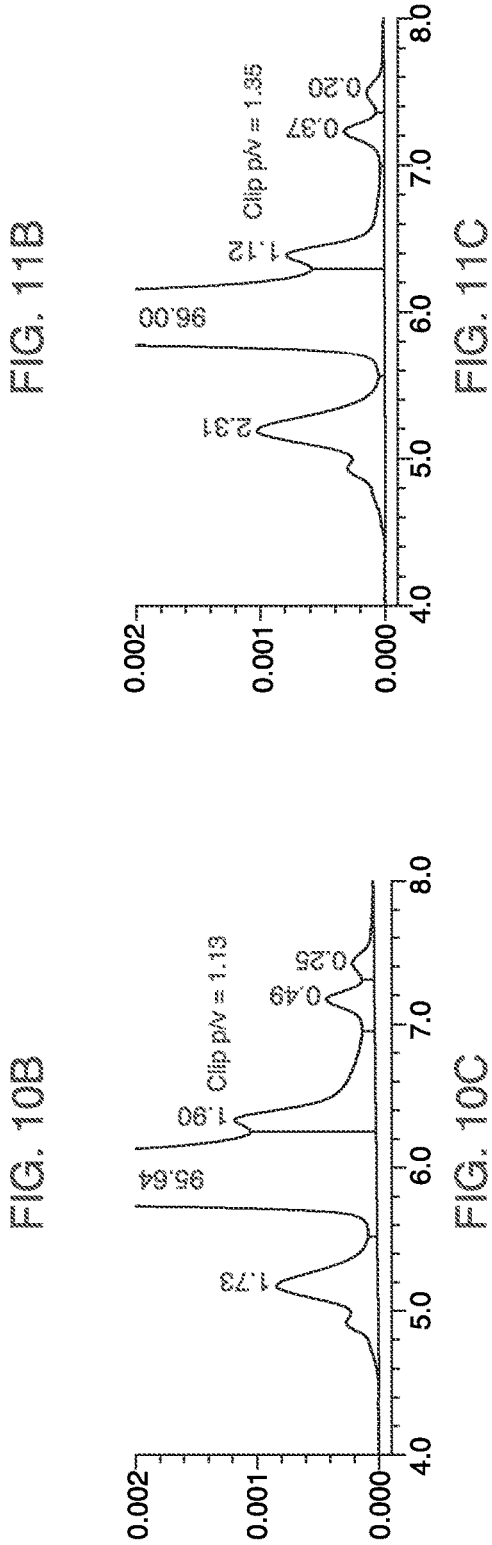
Figure 12:
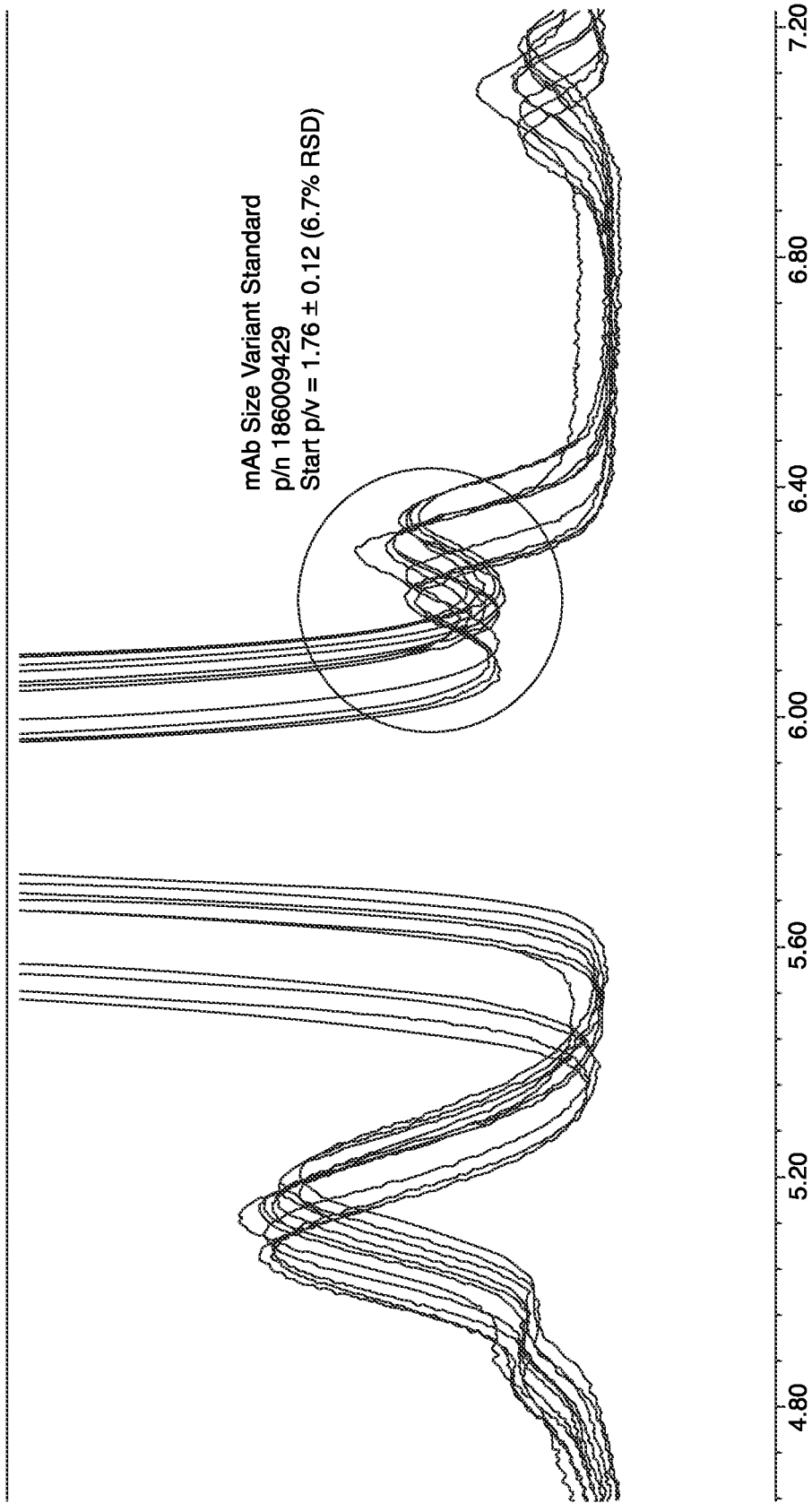
FIG. 12, show mAb variant chromatograms overlay chromatograms for 7 different column batches

It was observed that uracil produced reproducible efficiencies and retention times when buffer was added to the MeOH or ACN containing mobile phases. Using 25 mM sodium phosphate and 100 mM potassium chloride in 10% acetonitrile as the column testing and storage solvent (i.e., replacing the 20 vol % MeOH in the last step of the above protocol) has been found to reproducibly lead to the development and maintenance of a column's conditioning and performance while suppressing microbial growth. FIGS. 10A-10C show mAb variant chromatograms for three columns before storing in 25 mM sodium phosphate and 100 mM potassium chloride in 10% acetonitrile. FIGS. 11A-11C show mAb variant chromatograms for the same three columns after storing in 25 mM sodium phosphate and 100 mM potassium chloride in 10% acetonitrile for 2-weeks. As can be seen by comparing these figures, clip resolution is much improved after storage in 25 mM sodium phosphate and 100 mM potassium chloride in 10% acetonitrile for 2-weeks. A more comprehensive set of data demonstrating the benefit on the conditioning is shown in FIG. 12, which represents overlay chromatograms for 7 different batches 2.5 μm SEC BEH200 columns.

As seen from the above, failure to achieve desired consistency of an existing 2-week hold after rinsing was traced to the slight variations in the amount of buffer and salt remaining in the column after the final 20% MeOH rinse in the above protocol. It was realized that the residual buffer and salt content in the 20% MeOH storage solvent played a role in the column's continued conditioning. To address this problem, a low concentration of buffer and salt was added to the storage solvent.

The invention claimed is:

1. A storage solvent for long-term storage of a column comprising porous particles comprising a silicon-based inorganic-organic hybrid material for performing protein-based size exclusion chromatography, the storage solvent comprising water, from 5 to 15 vol % acetonitrile, from 5 to 100 mM of an alkali metal phosphate salt, and from 50 to 200 mM potassium chloride, wherein the storage solvent is for storing the column for a period of at least two weeks while providing a start peak-height to valley-height ratio (p/v) greater than 1.3.

2. The storage solvent of claim 1, wherein the storage solvent comprises from 10 to 50 mM sodium phosphate.

3. A column for protein-based size exclusion chromatography comprising:
    porous particles comprising a silicon-based inorganic-organic hybrid material; and
    a storage solvent comprising water, from 5 to 15 vol % acetonitrile, from 5 to 100 mM of an alkali metal phosphate salt, and from 50 to 200 mM potassium chloride, wherein the storage solvent is for storing the column for a period of at least two weeks while providing a start p/v ratio greater than 1.3, wherein the column comprises a housing having an inlet and an outlet, and wherein the porous particles and the storage solvent are provided in the housing, the column further comprising a plug or a valve at the inlet and the outlet to hold the storage solvent within the housing.

4. The column of claim 3, wherein the porous particles have a diameter ranging from 1 to 10 µm.

5. The column of claim 3, wherein the porous particles have an average pore diameter ranging from 50 to 1000 Angstroms.

6. The column of claim 3, wherein silicon-based inorganic-organic hybrid material comprises covalently attached hydrophilic surface moieties.

7. The column of claim 6, wherein the covalently attached hydrophilic surface moieties comprise dihydroxylated aliphatic groups in which two hydroxyl groups are positioned on adjacent carbon atoms in an aliphatic chain.

8. The column of claim 6, wherein the covalently attached hydrophilic surface moieties comprise hydroxy-terminated poly(alkylene oxide) groups.

9. The column of claim 3, wherein the housing comprises a metallic tube.

* * * * *